April 21, 1936.     G. D. RITCHIE     2,037,866
AUTOMOBILE HOOD FASTENER
Filed Aug. 16, 1934     3 Sheets-Sheet 1
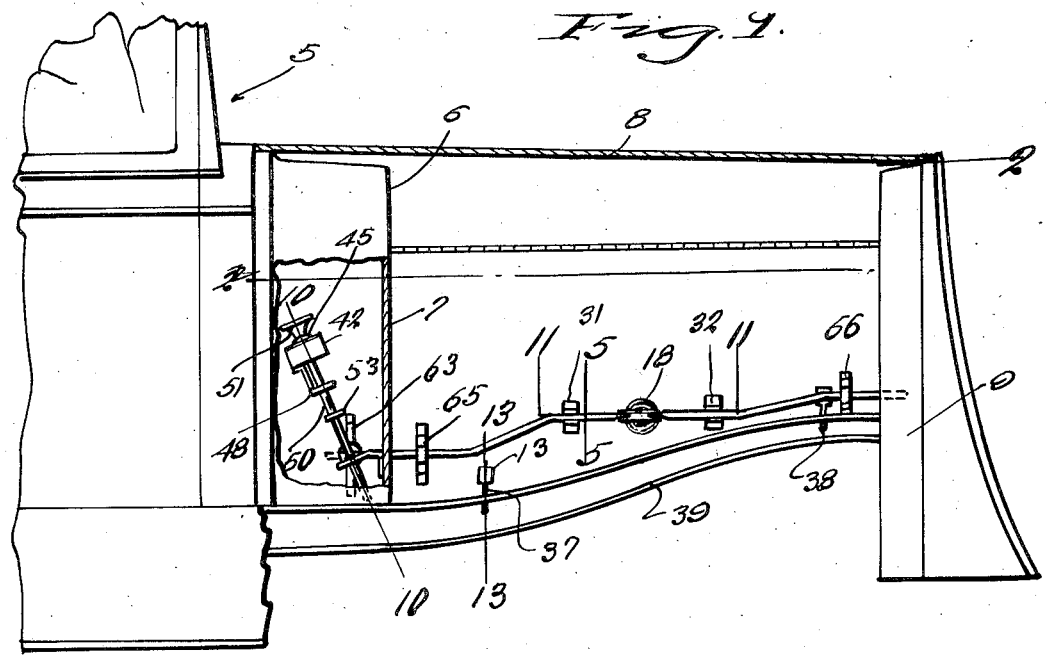
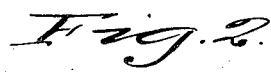
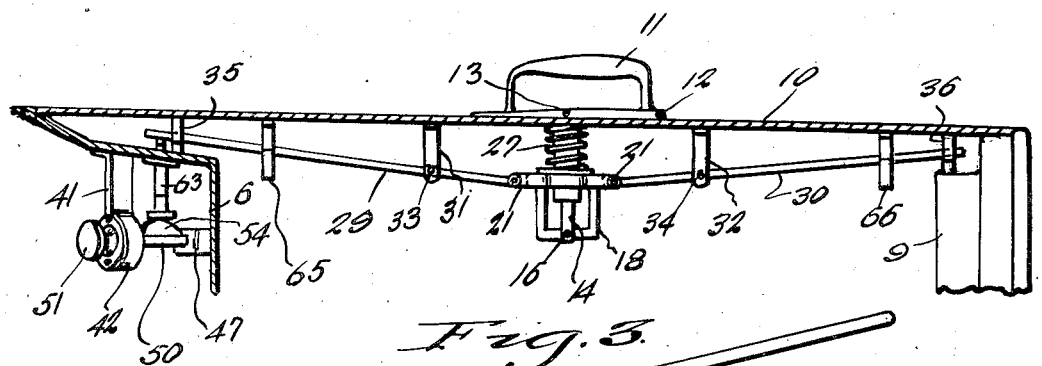
Inventor
George D. Ritchie
By Clarence A. O'Brien
Attorney April 21, 1936.     G. D. RITCHIE     2,037,866
AUTOMOBILE HOOD FASTENER
Filed Aug. 16, 1934     3 Sheets-Sheet 2
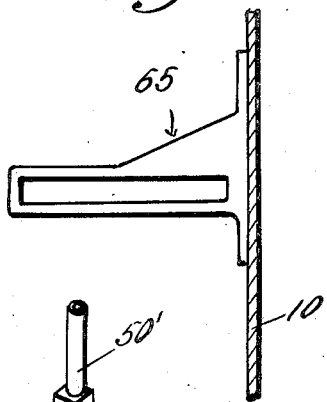
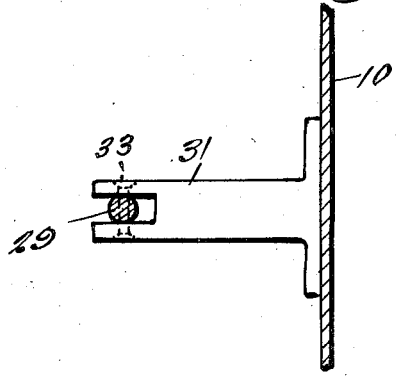
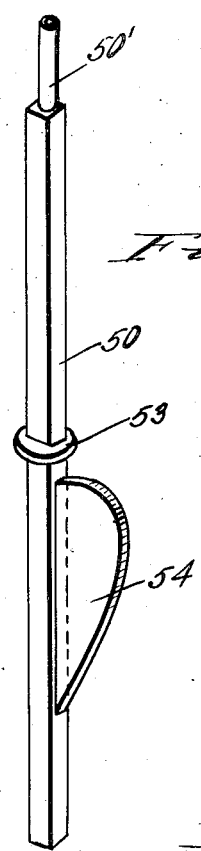
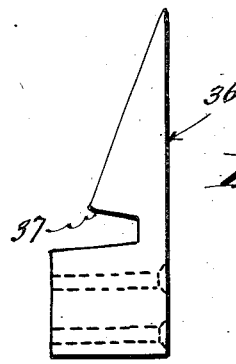
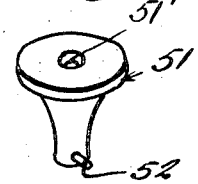
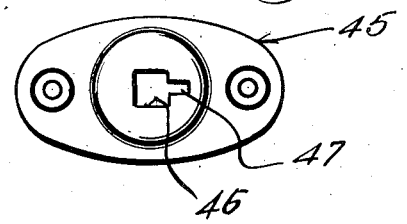
Inventor
George D. Ritchie
By Clarence A. O'Brien
Attorney

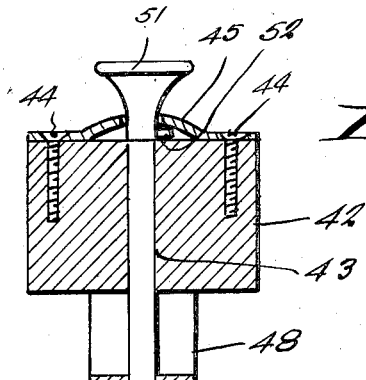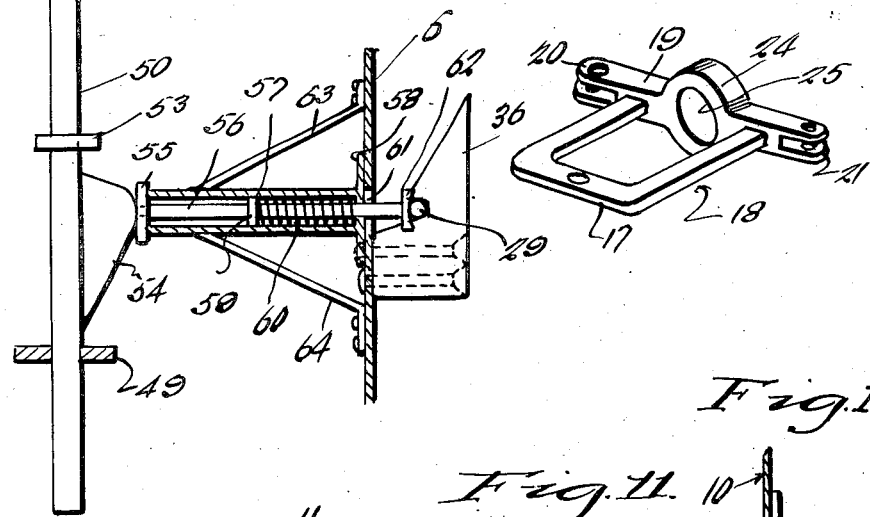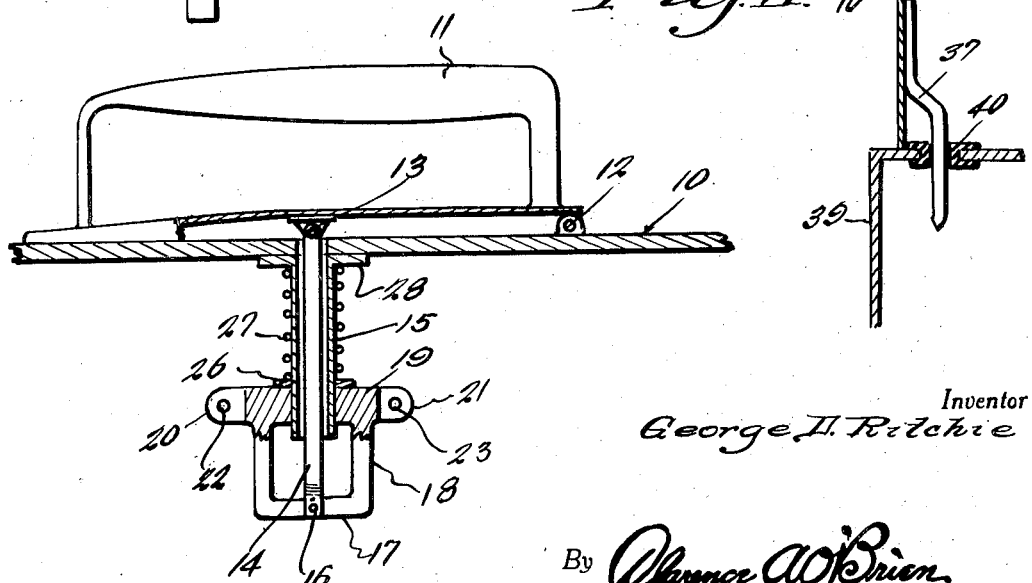

Patented Apr. 21, 1936

2,037,866

UNITED STATES PATENT OFFICE 2,037,866

AUTOMOBILE HOOD FASTENER

George D. Ritchie, Lillybrook, W. Va.

Application August 16, 1934, Serial No. 740,187

5 Claims. (Cl. 292—53)

My invention relates generally to means for securing the hoods of automobiles, and particularly to lock means controllable from the driving compartment of the automobile for positively locking the hood so that the same cannot be opened, and an important object of my invention is to provide a simple and inexpensive arrangement of this character which is rugged and efficient, and which is readily and quickly operable into and out of locking condition.

Other objects and advantages of my invention will be apparent from a reading of the following description in connection with the drawings, wherein for purposes of illustration I have shown a preferred embodiment of my invention.

In the drawings:—

Figure 1 is a longitudinal vertical sectional view through the hood and a portion of the cowl.

Figure 2 is a horizontal sectional view taken through Figure 1 approximately on the line 2—2 and looking downwardly.

Figure 3 is a perspective view of one of the latch bolts.

Figure 4 is a transverse vertical sectional view through the lower part of Figure 1 showing in side elevation one of the latch bolt guides.

Figure 5 is a transverse vertical sectional view taken through Figure 1 approximately on the line 5—5 and looking toward the left.

Figure 6 is a perspective view of the operating member.

Figure 7 is a perspective view of the knob of the operating member.

Figure 8 is a top plan view of the operating member locking plate.

Figure 9 is a side elevational view of one of the notched locking plates.

Figure 10 is a transverse vertical sectional view taken through Figure 1 approximately on the line 10—10.

Figure 11 is a horizontal sectional view taken through Figure 1 approximately on the line 11—11.

Figure 12 is a perspective view of the bolt operating yoke.

Figure 13 is a transverse vertical sectional view taken through Figure 1 approximately on the line 13—13.

Referring in detail to the drawings, the numeral 5 generally refers to the front part of an automobile of the usual type having the forwardly extended cowl 6 with the dashboard 7, and the hood 8 mounted over and enclosing the cowl 6 and the motor compartment including the radiator shell 9.

On the outside of the hinged side 10 of the hood is a handle 11 which is hinged to the outside of the hood as indicated at 12 and is connected by means of a pivot 13 to a plunger 14 which passes through the side 10 and through a guide tube 15 and connects pivotally as indicated at 16 to the bight portion 17 of a U-shaped yoke 18 which has its legs connected to the cross member 19 which has on each end a clevis 20, 21, respectively, each of which is provided with pivot holes 22, 23, respectively, and an enlargement 24 which is provided with bore 25 slidable on the exterior of the guide tube 15. A washer 26 on the guide tube engages the inner end of the helical coil spring 27 which extends between the washer 26 and the flange 28 on the outer end of the guide tube, the said flange engaging the inner side of the hood side 10 as shown in Figure 11. It is obvious that the spring 27 keeps the hinged handle 11 pulled against the outside of the hood side 10 and the yoke 18 in an extreme inward position, and that pulling outwardly on the handle 11 will compress the spring 27 and pull the yoke 18 toward the outside of the side of the hood.

Each of the clevises 20 and 21 is equipped with a pivot to connect the adjacent ends of the respective latch bolts 29, 30. Pivot brackets 31, 32 of the form illustrated in Figure 5 have a bifurcated portion within which the respective latch bolt is hinged on a pivot 33, 34 so that when the handle 11 is swung outwardly away from the position in which it is shown in Figures 2 and 11, the adjacent ends of the latch bolts will be swung toward the side 10 of the hood while the far ends of the latch bolts will be swung inwardly away from the side of the hood in a direction to disengage the far ends from the notched locking plates 35, 36, the form of which is clearly shown in Figure 9. The rear locking plate 35 is fixed to the side of the dashboard or cowl 6 as shown in Figure 2, while the front locking plate 36 is fixed to the side of the radiator shell 9. Because of this arrangement, the side 10 of the hood is locked against being opened while the said far ends of the respective latch bolts are engaged in the notches 37 of the locking plates 35, 36, respectively, and that in order to condition the side of the hood to be opened, the said far ends must be withdrawn from the notches 37 in the locking plates by swinging the latch bolts on the pivot points 33, 34 by outwardly swinging the handle 11.

Attached to the inner side of the hood side 10 are bayonets 37, 38 which enter openings in the chassis frame 39 which are bushed with rubber or fibre as indicated at 40 in such a way as to prevent the lowest part of the hood side from being pulled outwardly in a horizontal plane, and requiring that the hood side must be lifted vertically in order to be opened. Of course, the bayonets hold the hood side against being moved in such horizontal planes as to disengage the mentioned far ends of the latch bolts, unless such far ends of the latch bolts are withdrawn from the notches in the locking plates 36, 37 by positive operation of the handle 11.

The means for controlling the action of the locking mechanism described above from the interior of the driving compartment comprises a bracket 41 mounted on the side of the cowl or dashboard as shown in Figure 1 and having a cylindrical enlarged block 42 provided with a bore 43 and having fixed by screws 44 to its upper end an upwardly embossed plate 45 which has therein a key-shaped opening 46 including the small lateral portion 47. Depending from the block 42 is a guide bracket 48 and below this another guide bracket 49, the latter being secured to the dashboard 7 as shown in Figures 1 and 2. The guide brackets 48 and 49 have registered square openings which in turn are registered with the bore 43 in the block 42, so as to non-rotatably but slidably receive the square operating rod 50 which has turning on its upper end the swivelled operating knob 51 provided in one side with a small pin 52 which cannot enter the opening 46 but which may when properly positioned by turning the knob 51 enter the opening 47. The intermediate part of the rod 50 between the brackets 48, 49 is provided with a stop flange 53 and below this with a triangular cam 54 arranged to engage the head 55 on the end of a plunger 56 which works in a plunger barrel 57 having a flange 58 attached to the side of the hood 6. Intermediate its ends the plunger 56 has a head 59 which slides in the bore of the barrel 57 and confines a helical spring 60 circumposed on the plunger, between the outer end of the barrel and the head 59 so that the action of the spring is to push the plunger 56 in a left hand direction as viewed in Figure 10. The plunger passes through the outer end of the barrel and through an opening 61 in the side of the cowl and exteriorly thereof has a head 62 whose working face is slightly curved as shown in Figure 2 to engage the far end of the latch bolt 29. The plunger barrel 57 is supported by braces 63, 64 attached to the inside of the side of the cowl.

It will be obvious from the foregoing that the operating rod 50 may be depressed to a position in which its cam 54 will operate against the head 55 of the plunger and push the plunger out into such a position that it positively holds the far end of the latch bolt 29 engaged in the notch 37 of the locking plate 36 and that this positively prevents any movement of the latch bolt 29 out of engagement with the locking plate, and thereby prevents also corresponding movement of the latch bolt 30, with the consequence that the hood is securely dogged against being opened whether pressure be exerted thereon in a horizontal plane or in a vertical plane. The position of the notches 37 in the locking plates positively prevent movement of the hood in a vertical plane, while the engagement of the bayonets 37 with the chassis of the automobile positively prevents movement of the side of the hood in a horizontal plane, while the device of the invention is thus dogged.

It will be observed that while the operating member 50 is in the depressed locking position, the pin 52 on the knob 51 is preferably located under and is confined by the raised part 45 of the plate on the top of the block 42, the knob having been rotated to such a position that the pin 52 has entered the lateral portion 47 of the opening, the knob being then further rotated to bring the pin under the raised plate portion so that the operating member is positively prevented from moving upwardly out of the depressed position shown in Figure 10. It is obvious that by rotating the knob 51 sufficiently to bring the pin 52 within the opening 47, the operating member may be raised to disengage the cam 54 from the plunger, so that the plunger spring may withdraw the pluger from engagement with the latch bolt 29 and permit operation of the latch bolts by outward swinging of the handle 11. The stop flange 53 on the operating member is adapted to engage the underside of the bracket 48 to limit upward movement of the operating member beyond the necessary height to keep the cam 54 in partial engagement with the head of the plunger so that the plunger may be quickly operated into dogging position without lost motion.

Horizontally slotted guide brackets 65, 66 are secured to the inner side of the hood for slidably supporting the respective latch bolts for swinging movement in a horizontal plane, and to limit the inward swinging of the far ends of the latch bolts, these guide brackets being located intermediate the locking plates and the pivot brackets.

It will be obvious that the normal condition of the latch mechanism described is latched as far as the handle 11 and the latch bolts are concerned, and these may be operated to disengage the latch bolts, unless the operating member 50 has been manipulated to move the locking plunger into dogging position. Therefore, the operator of the vehicle, may instantly positively dog the hood of the automobile when leaving the automobile simply by pushing down on the operating member and turning it to engage the pin 52 under the plate 45, so that the hood will be permanently and positively dogged until the operating member is released and raised by the operator.

Although I have shown and described herein a preferred embodiment of my invention, it is to be definitely understood that I do not desire to limit the application of the invention thereto, and any change or changes may be made in materials, and in the structure and arrangement of parts within the spirit of the invention and the scope of the subjoined claims.

What is claimed is:—

1. In a device of the character described, a pair of latch bolts pivoted for swinging in approximately horizontal planes, a yoke between and pivoted to adjacent ends of the latch bolts, handle means for operating said yoke to swing the latch bolts to releasing position, spring means normally moving the latch bolts to operative position, said handle and yoke having a movement in a plane at right angles to the longitudinal axis of said latch bolts.

2. In a device of the character described, a pair of latch bolts pivoted for swinging in approximately horizontal planes, a yoke between and pivoted to adjacent ends of the latch bolts, handle means for operatively swinging the latch bolts, spring means normally pushing the yoke into a position to move the bolts to operative position, said handle and yoke having a movement in a plane at right angles to the longitudinal axis of said dogging bolts, and dogging means operable to engage the outer end of one of said latch bolts in a manner to positively prevent swinging of the latch bolts in an unlatching direction.

3. A device of the character described comprising a pair of swingable latch bolts, a yoke pivotally connected to both of the bolts, spring means pressing said yoke so as to normally hold said bolts in their latching position, a swingable handle operatively connected to said yoke, said handle being operable to move said yoke into a position in which said bolts are out of their latching position, dogging means, said dogging means including a spring retracted member mounted adjacent one of said swingable latch bolts, and a cam for operating said member into a position in which it engages the last mentioned latch bolt in a manner preventing operation of said latch bolts into unlatched position.

4. A device of the character described comprising a pair of swingable latch bolts, a yoke pivotally connected to both of the bolts, spring means pressing said yoke so as to normally hold said bolts in their latching position, a swingable handle operatively connected to said yoke, said handle being operable to move said yoke into a position in which said bolts are out of their latch position, dogging means, said dogging means including a spring retracted member mounted adjacent one of said swingable latch bolts, a cam for operating said member into a position in which it engages the last mentioned latch bolt in a manner preventing operation of said latch bolts into unlatched position, and a tubular member slidably mounting said yoke, said spring means including a helical spring circumposed on said tubular member.

5. A device of the character described comprising a pair of swingable latch bolts, a yoke pivotally connected to both of the bolts, spring means pressing said yoke so as to normally hold said bolts in their latching position, a swingable handle operatively connected to said yoke, said handle being operable to move said yoke into a position in which said bolts are out of their latching position, dogging means, said dogging means including a spring retracted member mounted adjacent one of said swingable latch bolts, a cam for operating said member into a position in which it engages the last mentioned latch bolt in a manner preventing operation of said latch bolts into unlatched position, and a tubular member slidably mounting said yoke, said spring means including a helical spring circumposed on said tubular member, said handle including an element passing through said tubular member and connected to said yoke.

GEORGE D. RITCHIE.